United States Patent

[11] 3,579,847

| [72] | Inventors | John W. Winter;<br>Guy K. Harrison, Jr., Houston, Tex. |
|---|---|---|
| [21] | Appl. No | 732,987 |
| [22] | Filed | May 29, 1968 |
| [45] | Patented | May 25, 1971 |
| [73] | Assignee | Aviation Instrument Manufacturing Corporation |

[54] ATTITUDE INDICATOR
12 Claims, 20 Drawing Figs.

[52] U.S. Cl. .................................................. 33/204
[51] Int. Cl. .................................................. G01c 19/44, G01d 7/02, G01d 5/02
[50] Field of Search .......................................... 33/204 (.2), 204; 116/129 (Nav.); 340/1950

[56] References Cited
UNITED STATES PATENTS

| 1,975,442 | 10/1934 | Allen | 33/204(.2) |
| 2,245,478 | 6/1941 | Jann et al. | 33/204(.2) |
| 2,415,707 | 2/1947 | Savage | 33/204(.2) |
| 2,489,294 | 11/1949 | Kenyon | 33/204(.2) |
| 2,515,199 | 7/1950 | Draper | 33/204(.2) |
| 2,524,745 | 10/1950 | Adkins | 33/204(.2) |
| 2,685,226 | 8/1954 | Crane | 33/204X |
| 2,696,597 | 12/1954 | Chombard | 33/204(.2)X |
| 3,019,532 | 2/1962 | Haerther et al. | 33/204(.2) |
| 3,032,886 | 5/1962 | Hulburt | 33/204(.2) |
| 3,208,426 | 9/1965 | Coffing | 33/204(.2)X |

FOREIGN PATENTS

| 916,997 | 9/1946 | France | 33/204(.2) |
| 989,767 | 5/1951 | France | 33/204(.2) |
| 1,198,485 | 6/1959 | France | 33/204(.2) |
| 349,026 | 5/1931 | Great Britain | 33/204 |
| 884,893 | 12/1961 | Great Britain | 33/204(.2) |
| 243,869 | 2/1947 | Switzerland | 33/204 |

OTHER REFERENCES
German printed application: Heider 1159171 Dec. 12, 1963

*Primary Examiner*—Robert B. Hull
*Attorneys*—Murray Robinson and Ned L. Conely

ABSTRACT: An instrument for indicating roll and pitch attitude of a host craft. The instrument comprises a support for attaching the instrument to the host craft and a terrain reference including a horizon line fixed relative to the host craft parallel to the transverse axis of the craft. A gyroscope is universally mounted in the support to maintain a stabilized datum reference perpendicular to the earth. The gyroscope is coupled through gears and linkages to a simulator which represents the host craft as viewed from the rear. The simulator is mounted adjacent the terrain reference for angular movement with respect to the horizon line to indicate roll and for radial movement relative to the horizon line center to indicate pitch. In one embodiment the simulator is a three dimensional representation of the host craft pivotably connected to the coupling mechanism for pitch movement relative to the horizon line in the same sense the host craft pitches relative to the natural horizon. As the host craft rolls or pitches relative to the stabilized datum gyroscope the rotation and movement of the gear and linkage coupling devices effect the various responsive displacements of the simulator for attitude indication.

PATENTED MAY 25 1971 3,579,847

John W. Winter
Guy K. Harrison, Jr.
INVENTORS

BY Bill B Berryhill
ATTORNEY

John W. Winter
Guy K. Harrison, Jr.
INVENTORS

BY
Bill B Berryhill
ATTORNEY

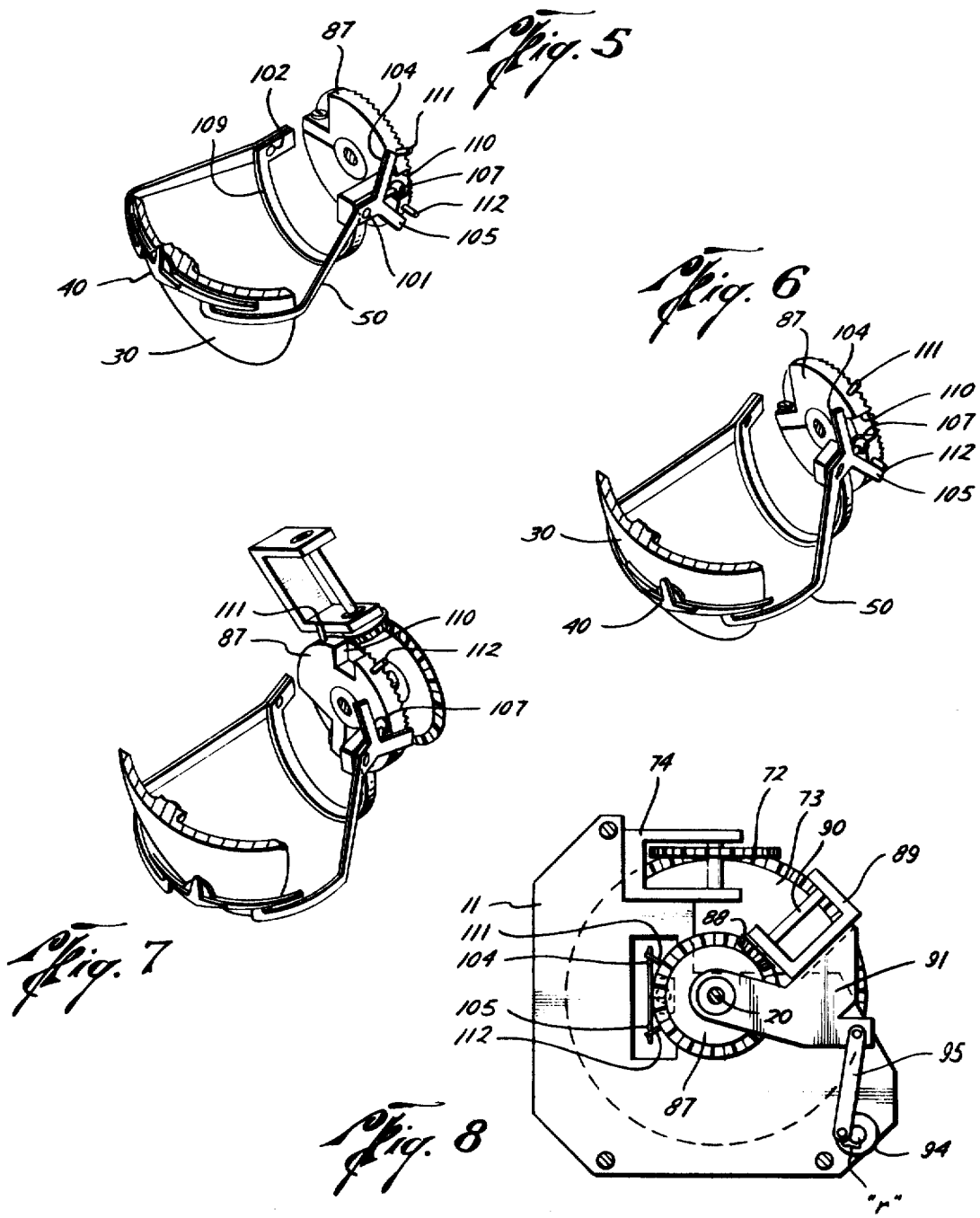

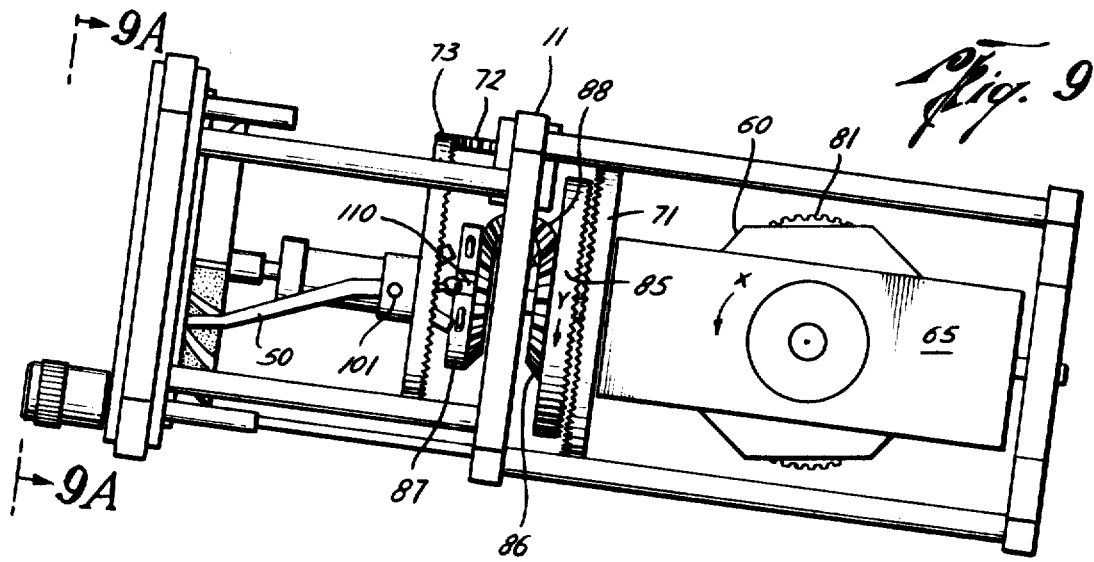
Fig. 9
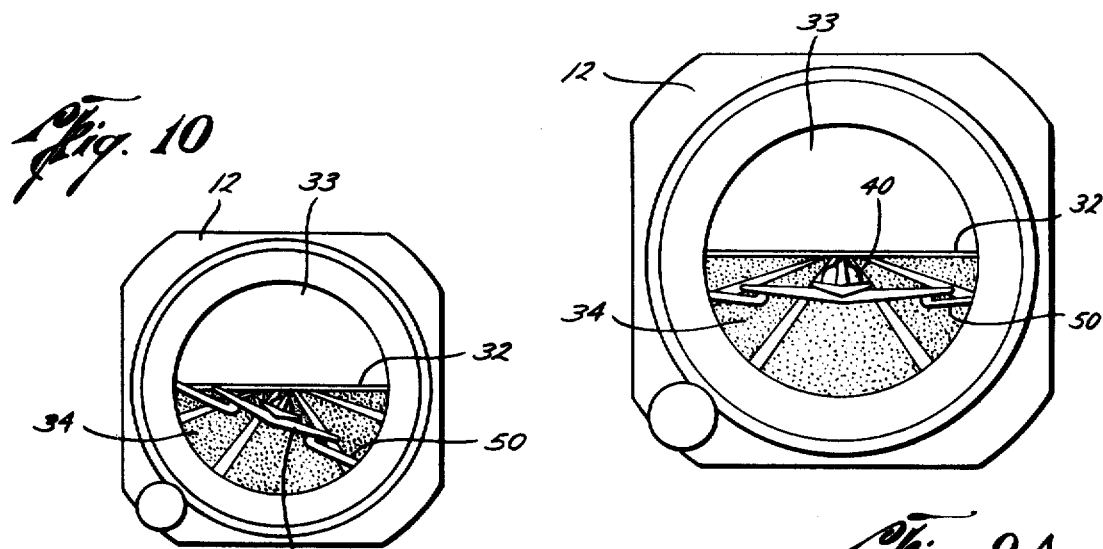
Fig. 10
Fig. 9A
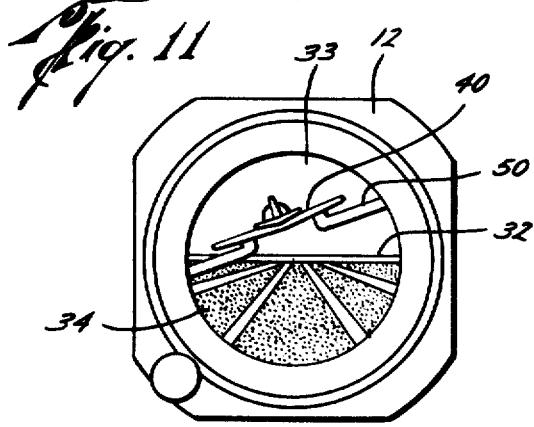
Fig. 11
John W. Winter
Guy K. Harrison, Jr.
INVENTORS
BY
Bill B. Berryhill
ATTORNEY John W. Winter
Guy K. Harrison, Jr.
INVENTORS BY
Bill B. Berryhill
ATTORNEY

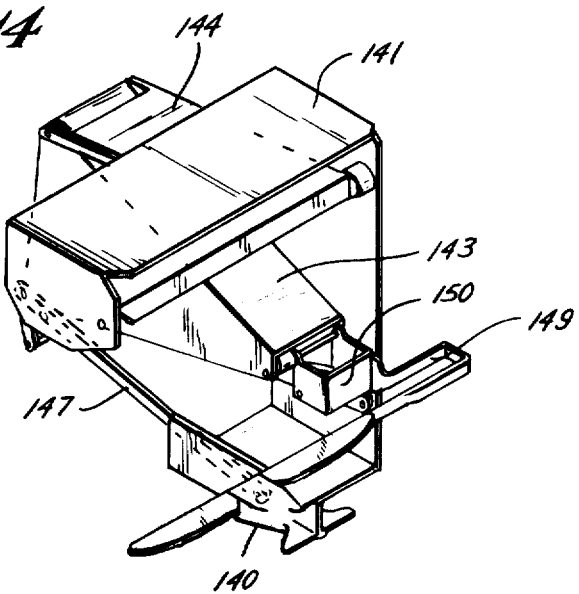
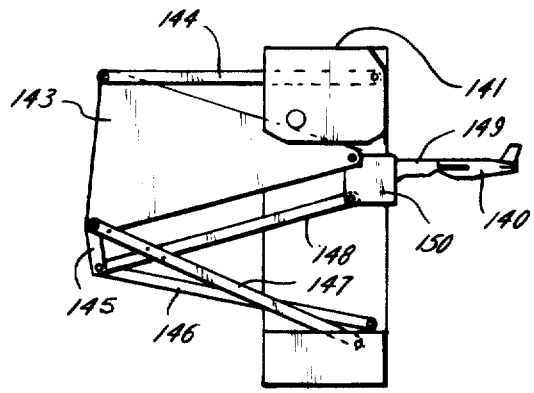
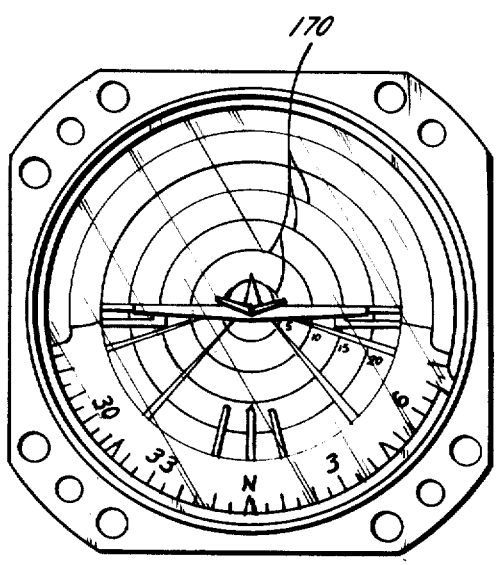
John W. Winter
Guy K. Harrison, Jr.
INVENTORS
BY
Bill B Berryhill
ATTORNEY

ATTITUDE INDICATOR

BACKGROUND OF THE INVENTION

The present invention relates to aircraft attitude instruments. More specifically it concerns an improved attitude instrument which will realistically indicate pitch and roll of an aircraft, relative to the earth's surface, to the pilot of the aircraft.

SUMMARY OF THE INVENTION

The present invention provides an attitude indicator whose terrain reference is fixed relative to the host aircraft. A simulated aircraft is coupled, to means for maintaining rigidity in space, such as a gyroscope, in such a way that movement of the host aircraft in pitch or roll or both simultaneously is translated to the simulated aircraft causing it to move in relationship to the fixed terrain reference in the same manner the host aircraft moves relative to the earth's surface.

Since the terrain reference is fixed relative to the host aircraft and the gyroscope remains fixed in space, the simulated aircraft must move in a direction, relative to the fixed terrain reference, opposite the movement of the gyroscope relative to the terrain reference. To accomplish such a movement of the simulated aircraft, unique gearing and linking mechanisms are provided for coupling the gyroscope and simulated aircraft. This coupling allows indication of bank through a complete cycle of 360°. For pitch indication exaggerated movement is provided for the first 20° or 30° movement. An escape device allows disengagement of the pitch mechanism in extreme cases of dive or climb so that the instrument is not damaged.

A modified embodiment of the invention provides a three-dimensional simulated aircraft which not only performs in the manner heretofore discussed but also actually dives and climbs as the host aircraft. This, of course, is very helpful to a pilot flying under blind conditions.

Not only does the present invention provide a more realistic indication of pitch and roll, but it does so accurately. Its simplicity makes it economically attractive and capable of replacing old-type units with a minimum of effort.

BRIEF DESCRIPTION OF THE DRAWING

To more fully understand the invention, reference in a description of preferred embodiments will be made to the following drawings in which:

FIG. 5 is a perspective view of the simulated aircraft and linking mechanism of one embodiment of the invention illustrating an attitude of level flight;

FIG. 6 is another perspective view of the simulated aircraft and linking mechanism of FIG. 5 illustrating a moderate dive attitude;

FIG. 7 is still another perspective view of the simulated aircraft and linking mechanism of FIGS. 5 and 6 illustrating an extreme dive attitude and showing the disengagement of pitch-responsive mechanisms;

FIG. 8 is a sectional view of the embodiment of FIG. 2 taken along line 8–8 of that FIG.;

FIG. 9 is a right side elevation view of the embodiment of FIG. 1 shown in a position of dive;

FIG. 9A is a view of the instrument of FIG. 9 as seen by the pilot of the host aircraft looking in the direction of arrows 9A–9A;

FIG. 10 is another view of the attitude indicator as seen by the pilot when the host aircraft is in an attitude of dive and right bank;

FIG. 11 is still another view of the attitude indicator as seen by the pilot when the host aircraft is in an attitude of climb and left bank;

FIG. 14 is a perspective view of the three-dimensional simulated aircraft and the linking mechanism of FIGS. 12–13;

FIG. 15 is a left side elevation view of the simulated aircraft and mechanism of FIG. 14; and FIG. 16 is a front elevation view of a modified embodiment of the invention for indicating the degree of pitch.

DESCRIPTION OF THE PREFERRED EMBODIMENTS

Figure 1:
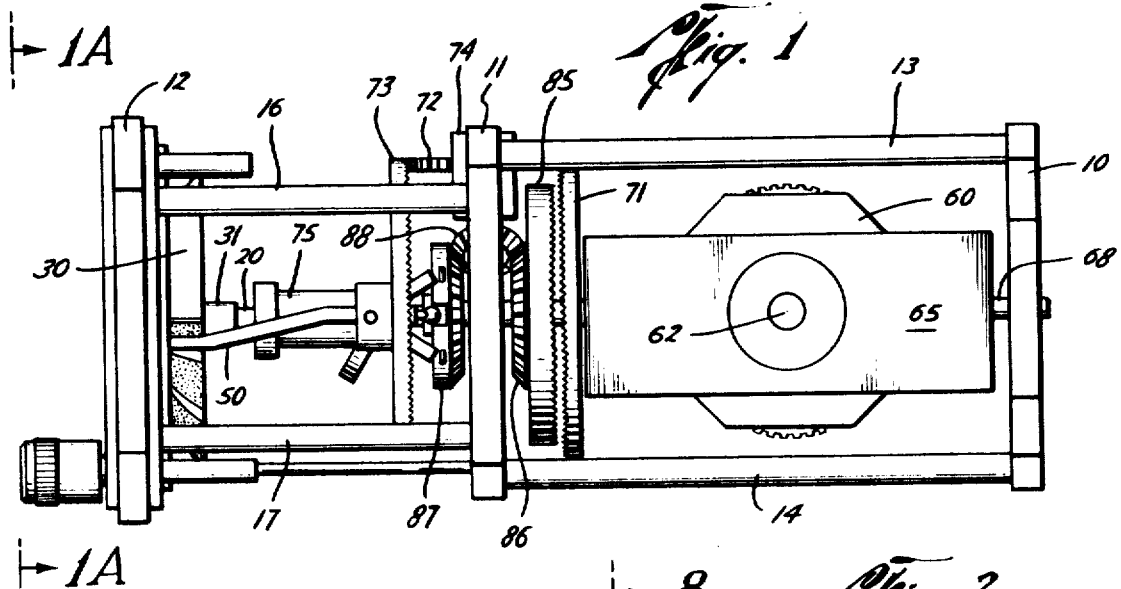
FIG. 1 is a right side elevational view of one embodiment of the invention shown with its case removed.

The preferred embodiment of the attitude instrument illustrated in FIGS. 1—4 comprises instrument framework including rear cover plate 10, bulkhead plate 11 and bezel assembly 12 connected by support rods 13. The entire instrument may be housed in a case (not shown) and fastened to the instrument panel of the host aircraft.

A bearing shaft 20 is mounted in the center of bulkhead 11 parallel to the longitudinal axis of the host aircraft. Shaft 20 projects from each side of bulkhead 11 and is stationarily affixed thereto by shrink fitting or any other suitable means. A terrain reference 30 is affixed to one end of shaft 20 by hub 31. Terrain reference 30 generally conforms to the shape of a spherical segment whose center lies on the axis of shaft 20. It could also be a flat plate.

Figure 1A:
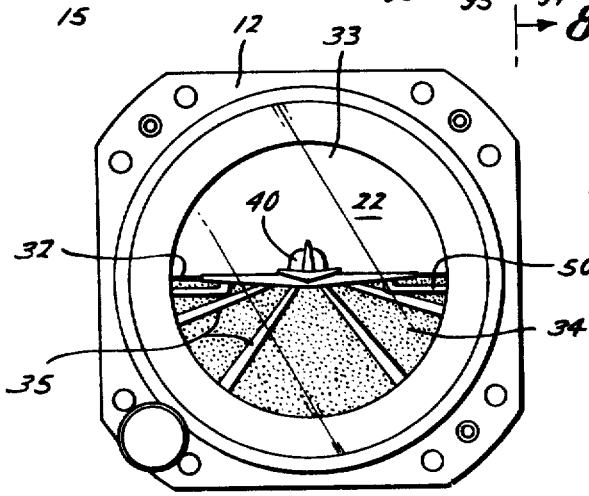
FIG. 1A is a front elevational view of the embodiment of FIG. 1 looking in the direction of arrows 1A–1A.

As better seen in FIG. 1A terrain reference 30 comprises a horizon line 32 which bisects the spherical segment in a plane generally parallel to both the longitudinal and lateral axes of the instrument. Since shaft 20 and terrain reference 30 are fixed to bulkhead 11, horizon line 32 remains fixed relative to the host aircraft regardless of its attitude. Bezel assembly 12 comprises transparent window 22 through which the majority of terrain reference 30 is visible at all times. For ease of viewing the upper half 33 of the terrain reference may be colored a light blue to represent the sky and lower half 34 may be a darker color to represent the ground. Several lines 35 converging near the center of horizon line 32 may also be provided to create a graphic of pictorial representation of the ground.

Mounted for movement between transparent window 22 and terrain reference 30 is a miniature airplane 40 simulating the host aircraft as viewed from the rear. Miniature airplane 40 is attached to a positioning arm or link 50 which translates movements of the host aircraft, through mechanisms to be later explained, to miniature airplane 40 causing it to move in relation to horizon line 32 in the same manner the host aircraft moves relative to the actual horizon.

Since horizon line 32 remains fixed relative to the host aircraft it remains fixed as viewed by the aircraft pilot. Thus, the movements of the miniature airplane 40 are easily interpreted by the pilot in blind flying conditions. In some presently used instruments the horizon line remains parallel to the actual horizon at all times conveying false movement impressions to the pilot, who moves with the host aircraft, and requiring a great deal of mental effort to properly interpret such movements.

To translate movements of the host aircraft to the miniature airplane 40, it is necessary to provide a means for maintaining a stabilized datum reference in space relative to the earth. This is referred to in the art as "rigidity in space." This may be accomplished by electric or vacuum-driven gyroscopes commonly known in the art. For purposes of illustration the present embodiment will be explained for use with an electric gyroscope 60 connected to an external power source by wires (not shown) in a conventional manner. There will be no further discussion of the construction and principles of operation of gyroscope 60, it being assumed that those skilled in the art have such knowledge. However, it should also be understood that the means for maintaining rigidity in space may be mounted externally of the instrument and coupled to the instrument through electromechanical servomechanisms.

Figure 3:
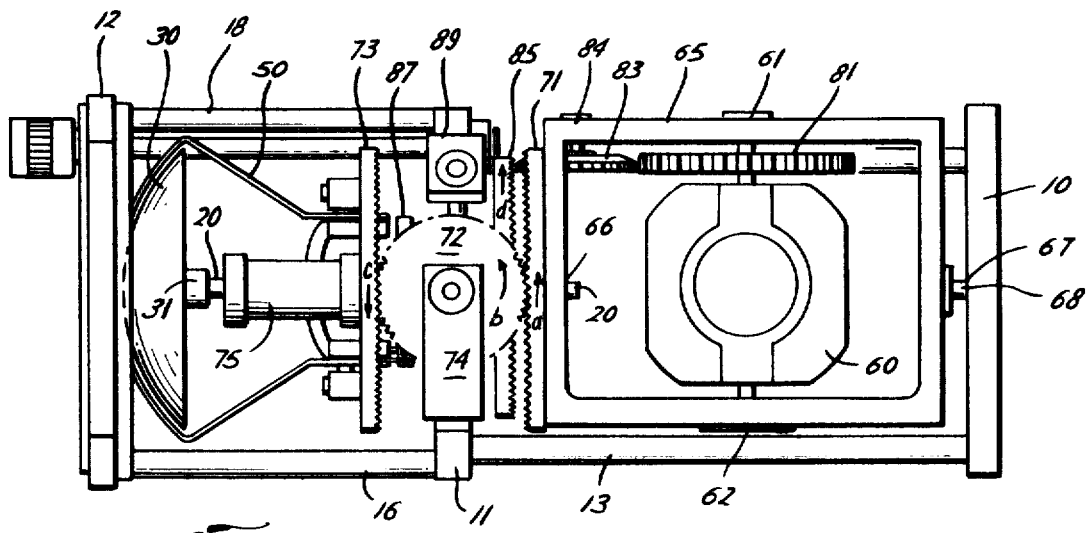
FIG. 3 is a plan view of the embodiment of FIGS. 1, 1A, and 2.
Figure 4:
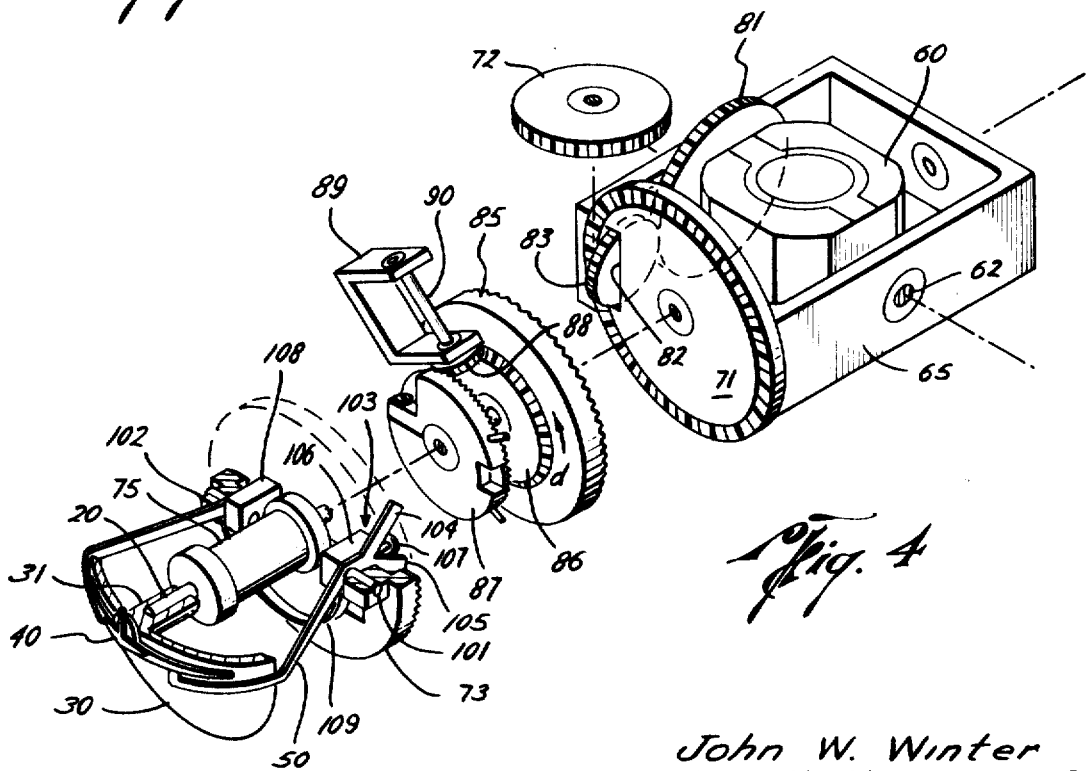
FIG. 4 is an exploded perspective view of the basic working parts of the embodiment of the invention shown in FIGS. 1-–3.

As best seen in FIG. 3, gyroscope 60 is suspended from precision bearings 61, 62 in gimbal assembly 65 and is free to pivot in the vertical plane as shown up to plus or minus 85° in pitch. The gimbal assembly 65 is mounted in bearings 66, 67 on one end of shaft 20 and shaft 68 which projects into rear cover plate 10. Gimbal assembly 65 has complete freedom of movement about the instrument's longitudinal axis.

A crown gear 71 is affixed to one end of gimbal assembly 65 for simultaneous rotation about the same axis. Crown gear 71 is coupled to another crown gear 73, having the same number of teeth, by spur gear 72 which is mounted at right angles to gears 71 and 73. Spur gear 72 is mounted for rotation in yoke piece 74 which is attached to bulkhead 11 (See also FIG. 8). A spool piece or hub 75 is affixed to or formed integrally with crown gear 73 to reduce radial play. Crown gear 73 and its spool piece 75 rotate about fixed shaft 20. Positioning arm 50 and miniature airplane 40 are attached to crown gear 73 for both rotation therewith and pivoting thereabout. The details of attachment and operation will be more fully explained hereafter. For the present, it is sufficient to say that roll movements of the host aircraft are translated to miniature airplane 40 by rotation of gear 73 and pitch movements by the pivoting of arm 50 about its connection with gear 73.

A spur gear 81 is affixed to gyroscope 60 for rotation about the same axis. A vertical slot 82 is cut through one end of gimbal assembly 65 and crown gear 71. A small spur gear 83 is mounted in bearing 84 near one end of gimbal assembly 65 for rotation about an axis parallel to the axis of gear 81. Spur gear 83 couples gear 81 and crown gear 85 by projecting through slot 82. Crown gear 85 has the same number of teeth as gear 81 and rotates about fixed shaft 20.

Concentrically mounted on gear 85 is bevel gear 86. This gear 86 may be integrally formed with gear 85 or it may be separately formed and affixed thereto. Bevel gear 86 is coupled to another bevel gear 87, having the same number of teeth, by a smaller bevel gear 88. Bevel gear 88 is mounted on a yoke piece 89 and shaft 90 for rotation about an axis perpendicular to shaft 20 (See also FIG. 8). Yoke 89 and the axis of shaft 90 are attached to a movable mounting 91 for limited movement in a plane perpendicular to fixed shaft 20, the reason for which will be later explained.

Looking again at arm 50 and miniature airplane 40, their connection to gears 73 and 87 will be more fully explained. Each end of arm 50 is pivotally mounted in a bearing block 101, 102 affixed to gear 73. One end of arm 50 has a foot extension 103 which projects through a slot in gear 73 to the space between gear 73 and gear 87. Foot 103 has two toes, 104 and 105, forming a "wye." Attached between toes 104 and 105 by a mounting 106 is a ball extension 107. A block 108 may be provided at the other end of arm 50 as a counterbalance. A structural support stirrup 109 may be provided to prevent twisting of arm 50.

Referring also now to FIGS. 5, 6 and 7, in which all instrument components are shown removed except terrain reference 30, miniature airplane 40, arm 50, and gear 87, the movement of arm 50 for indicating pitch will be illustrated. Assuming that the gear 73 does not move (zero roll), pivot points 101 and 102 remain fixed. In the level flight position shown in FIG. 5, ball 107 rides in a slot 110 of gear 87. Pins 111 and 112 project radially from the edge of gear 87 on each side of slot 110. Now suppose gear 87 is rotated counterclockwise (dive pitch). Arm 50 pivots downwardly toward the position of FIG. 6 due to the fact that ball 107 continues to follow slot 110. At a predetermined point ball 107 pivots out of slot 107, toe 105 pivots under pin 112 and upper toe 104 stops against the back of gear 73 (shown removed in these FIGS.) preventing further downward movement of arm 50 even though gear 87 may continue to rotate to the position shown in FIG. 7. In the present embodiment arm 50 and miniature airplane 40 stop after indicating a pitch angle of 25° to 30°. Thus, sensitive indication may be attained for the first 25° to 30° of pitch, after which the mechanism is disengaged to prevent damage to the instrument.

To return to a position of level flight, gear 87 is rotated in a clockwise direction. As shown in FIG. 6, on further clockwise rotation, pin 112 contacts lower toe 105 causing arm 50 to pivot until slot 110 is once again engaged by ball 107 for further pivoting of arm 50 to the level position of FIG. 5.

The illustration given has been for a dive pitch. It can be readily understood that climb pitch would be indicated similarly if gear 87 were rotated in the clockwise position from FIG. 5. It can also be understood that if both gear 87 and gear 73 were moved through equal degrees in the same direction miniature airplane 40 would bank in relationship to the fixed horizon line of terrain reference 30 but would not move in pitch. To indicate pitch movements gear 87 must move relative to gear 73.

As previously stated, gear 88, yoke 89 and shaft 90 are attached to mounting 91 for limited movement. The purpose of this construction is to allow minor pitch adjustments. It is understood that the pitch of the longitudinal axis of an aircraft in level flight may vary slightly depending on its load distribution. It is, therefore, desirable to have a "zeroing" adjustment on the attitude instrument.

Figure 2:
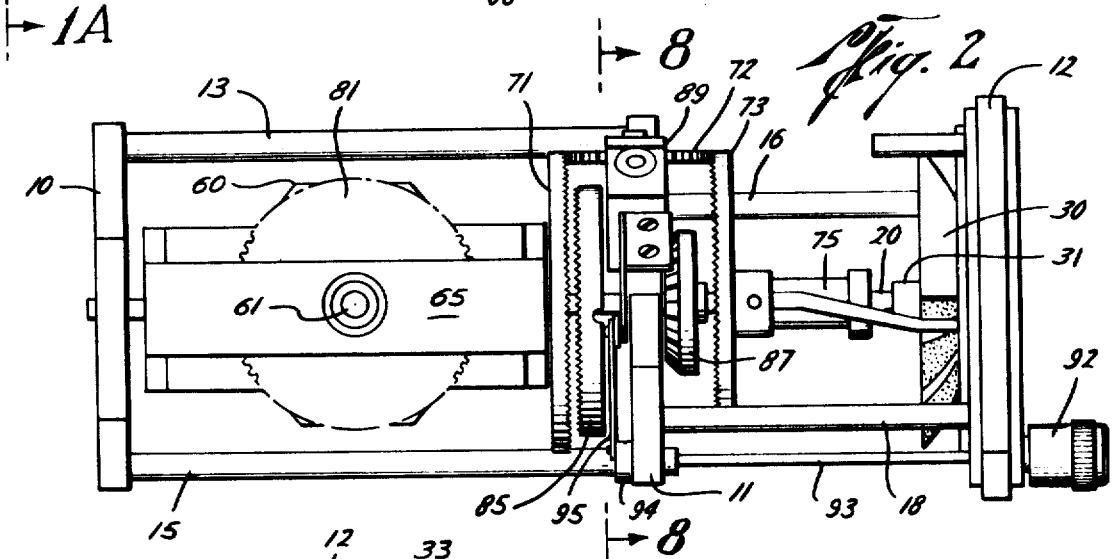
FIG. 2 is a left side elevational view of the same embodiment of FIGS. 1 and 1A.

Looking primarily at FIGS. 2 and 8, the pitch adjustment means, in addition to the foregoing components, comprises adjustment knob 92, rotating shaft 93, crank member 94, and link arm 95. Mounting 91 is rotatably connected to fixed shaft 20. Link 95 is connected at one end to mounting 91 and at the other end near the outside diameter of crank member 94. The aircraft pilot may turn knob 92 and shaft 93 which in turn causes crank member 94 to rotate. Since link 95 is connected at a radius $r$ near the edge of crank 94, mounting 91 can be moved, at its connection with link 95, from an upper position to a lower position approximately twice the radius $r$.

When mounting 91 moves (trim adjustment), bevel gear 88 rotates slightly driving gear 87 in one direction or the other. Since, as previously discussed, arm ball 107 rides in gear slot 110 this causes arm 50 to pivot about its mounting on gear 73. Knob 92 may therefore be turned until miniature airplane 40 is exactly aligned with horizon reference line 32 of the fixed terrain reference 30 as shown in FIG. 1A.

Now to explain the complete operation of the attitude instrument, a case of pure roll will be first illustrated referring to all of the drawings heretofore described. If the host aircraft is in level flight miniature airplane 40 and arm 50 will appear as shown in FIG. 1A and in FIGS. 1, 2 and 3. Now suppose the host aircraft banks to the right. Gimbal assembly 65 and gear 71 remain fixed due to the operation of gyroscope 60. However, relative to the instrument case and host aircraft, gear 71 moves in the direction shown by arrow $a$ in FIG. 3. Since the instrument framework, including bulkhead 11, moves with the host aircraft, gear 72 rotates counterclockwise as shown by arrow $b$ in FIG. 3. Gear 72 drives gear 73 at a 1:1 ratio in the opposite direction shown by arrow $c$.

Since gear 81 affixed to gyroscope 81 has not moved, gear 83 does not rotate. However, this causes gear 85 to rotate as shown by arrow $d$ together with gear 71. Since gear 86 is affixed to gear 85 it causes bevel gear 88 to rotate driving gear 87 in a 1:1 ratio. Therefore, relative to fixed terrain reference 30 and the host aircrafts, gears 73 and 87 have rotated in a clockwise direction the same number of degrees that the host aircraft has rolled relative to gimbal assembly 65 and gears 71 and 85. Thus, to the aircraft pilot, miniature airplane 40 has banked to the right, relative to the fixed horizon line of terrain reference 30, the same number of degrees the host aircraft has banked relative to the actual horizon.

Next a case of pure pitch will be illustrated. Suppose the aircraft goes into a dive. The instrument will move, relative to the horizontal, from the position shown in FIG. 1 to the position of FIG. 9. Referring to FIGS. 1, 3 and 9, as the instrument framework and gimbal assembly 65 pitches downward, gyroscope 60 and its attached gear 81 rotate relative to gimbal 65 in the counterclockwise direction shown in FIG. 9 (arrow x). This causes gear 83 to drive gear 85 in a 1:1 ratio in a clockwise direction (arrow y). Bevel gear 86, attached to gear 85, causes gear 88 to drive gear 87 at a 1:1 ratio in the opposite direction. Thus, as previously described with reference to FIGS. 4, 5 and 6 arm 50 is pivoted downwardly since gear slot 110 and arm ball 87 move upwardly while gear 73 and arm pivot points 101, 102 remain fixed relative to the instrument cause and host aircraft. Miniature airplane 40 would then appear, as in FIG. 9A, vertically displaced below fixed horizon line 32 in the ground area 34 of the fixed terrain reference. It can also be said that miniature airplane 40 is radially displaced from the center of horizon line 32. This, of course, would indicate directly to the pilot a dive course.

It can be easily understood that the operations just described for cases of pure right bank and pure dive will cooperate in a case of combined right bank and pure dive attitude to present the display of FIG. 10. Of course, any combination of roll and pitch may be attained. FIG. 11 illustrates a condition of left bank and climb attitude.

Referring now to FIGS. 12 through 15, another embodiment of the invention, in which a three-dimensional aircraft simulator is used, will be described. Not only will the simulator be rotated and radially displaced to indicate roll and pitch, it will also assume an attitude of dive or climb with respect to the pitch axis of the host aircraft. The pilot will then observe the simulator as though he were standing on a stabilized platform at the rear of the plane.

As in the previous embodiment, the three-dimensional instrument includes an instrument case or support means 110, bulkhead 111, and bezel assembly 112 all fixed to the instrument panel of a host aircraft. A shaft 113 is fixed to bulkhead 111 and terrain reference plate 114 is affixed to the end of shaft 113. As in the prior embodiment terrain reference 114 comprises horizon line 120 above which a sky portion 121 may be a light color such as blue. Below horizon line 120 terrain reference 114 may comprises a darker ground portion 122 with lines 123 converging near the center of horizon line 120 to create a perspective representation of the ground.

As in the previous embodiment a gyroscope may be universally mounted in the instrument to provide a means for maintaining rigidity in space. Since this construction is similar it has been eliminated in the drawing for simplification. The gearing mechanism of this embodiment is also similar to the prior embodiment providing nearest the terrain reference a final roll drive gear 130 and a pitch drive gear 131 mounted for rotation about fixed shaft 113 similar to gears 73 and 87, respectively, of the prior embodiment. However for this particular embodiment the gearing mechanism is altered slightly so that gear 131 rotates in response to pitch in the opposite direction of gear 87 to provide the same vertical displacement of the three-dimensional aircraft model 140.

To obtain the special dive and climb attitude of simulator 140 a special linking mechanism is provided which can best be understood with reference to FIGS. 14 and 15. First a framework 141 is provided which is attached by other framework 142 (See FIGS. 12 and 13) to roll gear 130 for simultaneous rotation therewith. A triangle member 143 is then pivotally attached to framework 141 by links 144, 145, 146 and 147 for movement in a plane perpendicular to the pitch axis of simulator 140. Simulator 140 is attached by arm 149 and link 150 to one corner of triangle member 143 for pivotal movement thereabout. Thus a quadrilateral is formed by the lower edge of triangle member 143 and links 145, 148 and 150. Links 145, 146, 147 and part of mounting 141 form a crossed quadrilateral when viewed from the side as in FIG. 15. The movement of triangle 143 is controlled by links 144 and 147. This produces radial displacement of simulator 140 in response to pitch movement of the host craft. The remaining links together with the triangle 143 then control the attitude of the simulator 140. Thus, both radial displacement and attitude placement of the simulator is effected to indicate pitch attitude of the host craft. Generally, when links 150 and 145 are perpendicular to the horizontal, as shown in FIG. 15, arm 149 will position simulator 140, as shown, in an attitude of no pitch. Thus, the roll axis of simulator 140 would be perpendicular to horizon line 120 on the terrain reference 114 and if the host aircraft were in level flight the pitch axis of simulator 140 would be parallel to horizon line 120.

Figure 12:
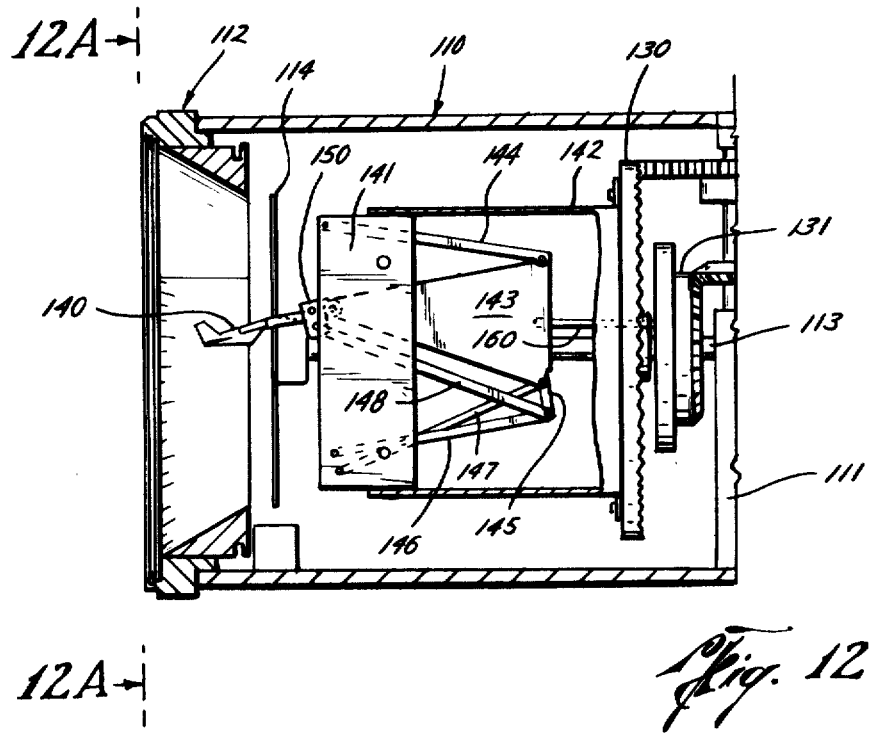
FIG. 12 is a right side elevation view, partially in section, of a portion of another embodiment of the invention employing a three-dimensional simulated aircraft indicator and showing the indicator in a position of climb.
Figure 12A:
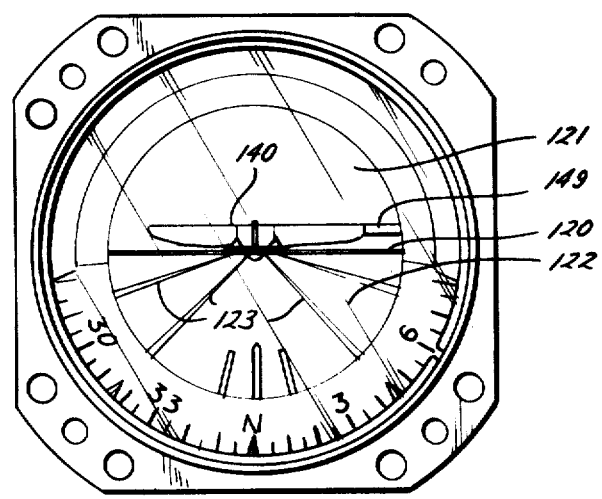
FIG. 12A is a front elevation of the embodiment of FIG. 12 as seen by the pilot looking in the direction of arrows 12A–12A.

To indicate pitch of the host aircraft, triangle member 143 would be moved vertically if the aircraft is not in bank. To illustrate these movements a case of pure climb will first be illustrated with reference to FIGS. 12 and 12A. A pin member 160 is affixed near one edge of pitch gear 131 projecting through a slot (not shown) in gear 130 to engage a horizontal slot (not shown) in the rear of triangle member 143. When the host aircraft begins to climb the gearing mechanism and gyroscope causes gear 131 to rotate counterclockwise as viewed from the left. This causes pin 160 to move upwardly and due to the linking members 145 to displace simulator 140 vertically or radially upward and in a climb attitude so that it would appear to the pilot in reference to horizon line 120 as shown in FIG. 12A.

Figure 13:
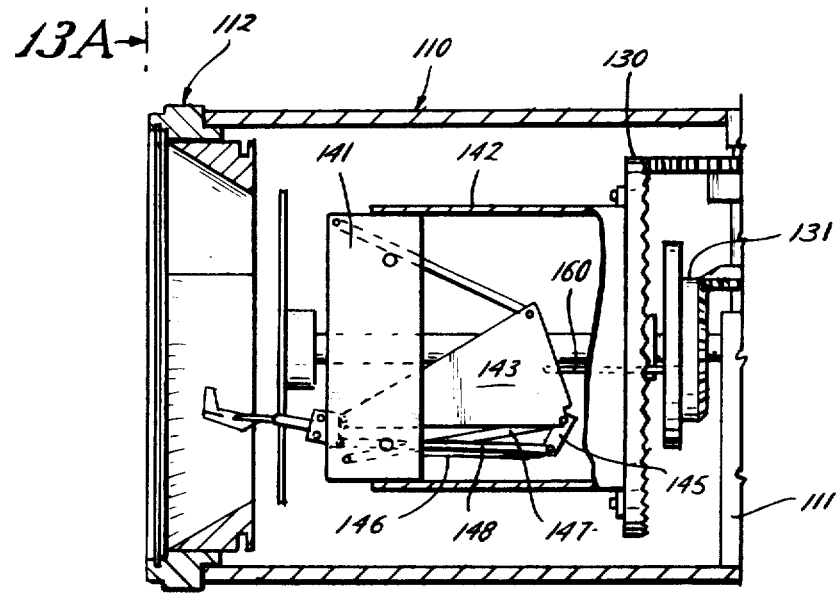
FIG. 13 is a right side elevational view, partially in section, of the embodiment shown in FIG. 12 except showing the simulated aircraft in a dive position.
Figure 13A:
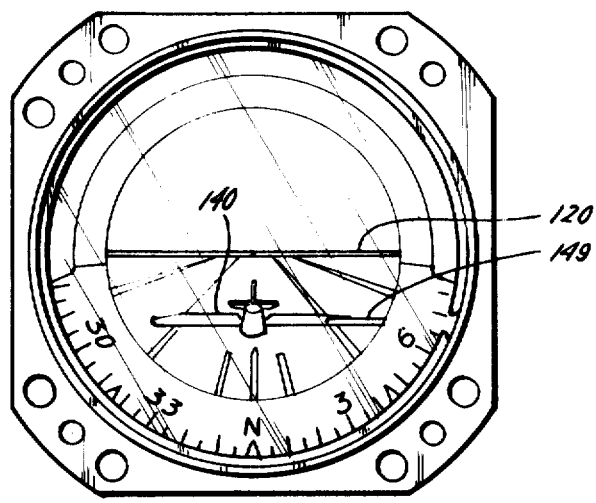
FIG. 13A is a front elevation of the embodiment of FIG. 13 looking in the direction of arrows 13A–13A.

In a case of pure dive, illustrated in FIGS. 13 and 13A, gear 131 would rotate clockwise causing pin 160 and triangle member 143 to move downwardly. The arrangement of the various links would then cause simulator 140 to be vertically or radially displaced downwardly and in an attitude of dive appearing, in reference to horizon line 120, as shown in FIG. 13A.

The gear ratios in the gearing mechanism could be determined so as to permit movement without interference through the total pitch capabilities of the gyroscope. If more sensitive movements were desired for pitch near level flight, an escape mechanism could be provided similar to the escape mechanism described with the prior embodiment and shown in FIGS. 5, 6 and 7.

Of course, since the entire linkage mechanism and simulator 140 are attached through framework 142 to roll gear 130, roll indication throughout 360° would be accomplished as in the prior embodiment. The roll indication could also function simultaneously with the pitch indication as described in the prior embodiment.

It is clear that in both embodiments described herein no matter what the attitude of the aircraft simulator is, its pitch axis would be perpendicular to radial lines extending from an axis passing through the center of the horizon line parallel to the host aircraft's roll axis. Therefore, calibrated concentric circles such as 170 shown in FIG. 16 could be provided on the fixed terrain reference to indicate the angle of pitch with reference to horizontal flight.

The foregoing description of the two preferred embodiments disclose a much improved aircraft attitude instrument employing a fixed terrain reference and horizon line. Both embodiments indicate realistically to the pilot, the attitude in pitch and roll of his aircraft without having to interpret apparent motion of the horizon line as in presently used attitude instruments. The instrument is well adapted for replacement of other type units in existing aircraft as well as for standard use in future aircraft.

Although only two embodiments have been described herein, many modifications and alterations thereof may be made by one skilled in the art without departing from the spirit of the invention. Therefore, it is intended that the scope of the invention be limited by the claims which follow.

We claim:
1. An attitude instrument comprising:
   mounting means rigidly fixed in a host craft,
   terrain reference means attached to said mounting means comprising a horizon line fixed in a position parallel to the transverse axis of said host craft,
   simulator means mounted for movement adjacent said terrain reference means representing said host craft as viewed from the rear,
   datum means maintaining a stabilized reference in space substantially perpendicular to the earth, and
   means coupling said simulator means and said datum means responsive on movements of said host craft to position said simulator means for indicating roll and pitch attitude of said host craft,
   said coupling means comprising: a first gear train coupling said datum means and a link member attached to said simulator means and responsive on roll movement of said host craft to position said simulator means by angular displacement of the transverse axis of said simulator means relative to said horizon line in the same manner the transverse axis of said host craft is displaced relative to the natural horizon, said coupling means also comprising a second gear train coupling said datum means and said link member and responsive on pitch movement of said host craft to position said simulator by radial displacement in one direction from the center of said horizon line when said host craft is in a climb attitude and in the opposite direction when said host craft is in a dive attitude.

2. The attitude instrument of claim 1, characterized in that said link member is mounted for pivoting about an axis which is fixed relative to the last gear of said first gear train and perpendicular to the axis of said gear.

3. The attitude instrument of claim 2, characterized in that a portion of said link member is engageable with the last gear of said second gear train for pivoting of said link member about its axis on pitch movement of said host craft to effect said radial displacement.

4. The attitude instrument of claim 1, characterized in that said link member is mounted for pivoting about an axis substantially perpendicular to the longitudinal axis of said host craft, the last gear of said second gear train being engageable with a portion of said link member for pivoting of said link member about its axis on pitch movement of said host craft to effect said radial displacement.

5. The attitude instrument of claim 4, characterized in that portion of said link member and said last gear are constructed and arranged to disengage in attitudes to limit said radial displacement of said simulator means.

6. The attitude instrument of claim 5, characterized in that said portion of said link member for engagement with said last gear comprises a foot extension having two toes forming a wye and a representation member therebetween, said ball-shaped member being retained in a slot on said last gear during said engagement and pivotable out of said slot for said disengagement during said extreme attitudes of dive or climb, said last gear having pin members projecting radially away from its edges, one of said pins being engageable with one of said toes on return from said extreme attitudes to pivot said link member and to cause said ball member to reengage said slot.

7. The attitude instrument of claim 1, characterized in that said simulator means comprises a three-dimensional representation of said host craft with corresponding pitch and roll axes and in that said link member comprises a series of links responsive on said radial displacement to position said three-dimensional representation in attitudes of pitch representative of the pitch attitude of said host craft.

8. The attitude instrument of claim 7, characterized in that said series of links comprise four pivot connections forming a quadrilateral two of said pivot connections adjacent to each other being on said three dimensional representation to effect said attitudes of pitch.

9. An attitude instrument for a host craft comprising:
   horizon reference means comprising a line fixed in a position parallel to the transverse axis of said craft,
   three dimension craft simulator means having a pitch axis and a roll axis,
   datum means maintaining a stabilized reference substantially perpendicular to the surface of the earth, and
   means coupling said datum means and said simulator means responsive on movement of said host craft to position said simulator means for indicating roll and and pitch attitude of said host craft,
   said coupling means comprising a first gear train coupling said datum means and link means attached to said simulator means and responsive on roll movements of said host craft to position said simulator means by angular displacement of its pitch axis relative to said horizon line in the same manner the transverse axis of said host craft is displaced relative to the natural horizon, said coupling means also comprising a second gear train coupling said datum means and said link means and responsive on pitch movement of said host craft to radially displace said simulator means from the center of said horizon line and to position said simulator means in attitudes of pitch representative of the pitch attitude of said host craft.

10. The attitude instrument of claim 9, characterized in that said link means is mounted on the last gear of said first gear train for rotation therewith about an axis parallel with the longitudinal axis of said host craft.

11. The attitude instrument of claim 10, characterized by a fixed pin member projecting from the last gear of said second gear train engageable with said link means for effecting said radial displacement and pitch positioning of said simulator means.

12. The attitude instrument of claim 11, characterized in that said link means comprises a multiple number of movable links connected at a number of pivot points and mounted in a mounting fixed to said last gear of said first gear train for pivoting about said pivot points on rotation of said second gear train last gear and consequent movement of said fixed pin, some of said links controlling said radial displacement of said simulator while others control said positioning of said simulator in attitudes of pitch.